United States Patent [19]

Morrison, Jr. et al.

[11] 4,141,302
[45] Feb. 27, 1979

[54] FURROW OPENER AND APPARATUS FOR NO-TILLAGE TRANSPLANTERS AND PLANTERS

[75] Inventors: John E. Morrison, Jr., Lexington, Ky.; Charlie F. Abrams, Jr., Raleigh, N.C.

[73] Assignee: The United States of America as represented by the Secretary of Agriculture, Washington, D.C.

[21] Appl. No.: 844,418

[22] Filed: Oct. 21, 1977

Related U.S. Application Data

[62] Division of Ser. No. 618,971, Oct. 2, 1975, Pat. No. 4,090,456.

[51] Int. Cl.² ............................................. A01C 5/06
[52] U.S. Cl. ........................................ 111/52; 111/81; 111/85; 111/87; 172/138; 172/170; 172/538; 172/611
[58] Field of Search ................... 111/2, 3, 15, 20, 21, 111/22, 24, 52, 53, 54, 55, 56, 61, 62, 63, 64, 65, 66, 81, 84, 88, 60, 67, 83, 87, 85; 172/138, 139, 140, 141, 383, 538, 539, 603, 613, 615, 681, 776, 145, 146, 147, 611, 657, 658, 619, 633, 570, 572, 573, 624, 629

[56] References Cited

U.S. PATENT DOCUMENTS

| | | | |
|---|---|---|---|
| 343,907 | 6/1866 | Kissner et al. | 111/60 |
| 653,298 | 7/1900 | King | 111/3 |
| T862011 | 5/1969 | Koronka et al. | 111/88 |
| 1,073,702 | 9/1913 | Owens | 111/3 |
| 1,659,009 | 2/1928 | Towle | 111/67 |
| 1,748,308 | 2/1930 | Richard | 111/83 X |
| 2,791,192 | 5/1957 | Ryding | 111/3 |
| 2,833,231 | 5/1958 | Dahlinghus | 111/52 X |
| 2,944,495 | 7/1960 | Wilson et al. | 111/2 |
| 2,960,944 | 11/1960 | Poll | 111/2 |
| 3,131,657 | 5/1965 | Morris | 111/87 X |
| 3,200,778 | 8/1965 | Whelchel | 111/85 |
| 3,543,704 | 12/1970 | Hansen et al. | 111/52 |
| 3,610,185 | 10/1971 | Scarborough | 111/85 X |
| 3,611,956 | 10/1971 | Moore | 111/87 X |
| 3,673,970 | 7/1972 | Hatcher | 111/85 |
| 3,701,327 | 10/1972 | Krumholz | 111/81 |
| 3,749,035 | 7/1973 | Cayton et al. | 111/62 X |
| 3,799,079 | 3/1974 | Dietrich | 172/145 X |
| 3,845,730 | 11/1974 | Koronka | 111/88 |

FOREIGN PATENT DOCUMENTS

| | | | |
|---|---|---|---|
| 495821 | 9/1950 | Belgium | 172/538 |
| 9275 | 5/1906 | Fed. Rep. of Germany | 111/88 |
| 245767 | 10/1960 | France | 111/3 |
| 204756 | 10/1967 | U.S.S.R. | 111/2 |

OTHER PUBLICATIONS

Morrison, J. E. et al. (1973) "Transplanter Modification and Survival of Transplants Under No Tillage Conditions" Hortscience volume 8, No. 6 pp. 483–485.

*Primary Examiner*—Edgar S. Burr
*Assistant Examiner*—James R. Feyrer
*Attorney, Agent, or Firm*—M. Howard Silverstein; Salvador J. Cangemi; David G. McConnell

[57] ABSTRACT

A new apparatus for opening furrows in soil is disclosed. Specifically, this apparatus consists of an opening mechanism, a closing mechanism, an automatic seed planting mechanism, an automatic seedling planting mechanism, a driving means, a towing means, and the salient component parts necessary to make them function.

20 Claims, 12 Drawing Figures

FURROW OPENER AND APPARATUS FOR NO-TILLAGE TRANSPLANTERS AND PLANTERS

This is a division, of application Ser. No. 618,971 filed Oct. 2, 1975 now Pat. No. 4,090,456.

PRIOR ART AND BACKGROUND OF INVENTION

This invention relates to an apparatus for furrow opening. More specifically, it is a soil opening apparatus used with tillage and planting machinery.

No-tillage is a planting system whereby a crop is planted directly into an essentially unprepared seedbed. It means the elimination of any tillage operations from the previous crop through harvest other than what is necessary to properly place and cover the seed.

There are three main areas in a no-tillage planting system which require adequate management, materials and equipment; namely, development and utilization of a surface mulch, application of herbicides and insecticides without tillage and planting (or transplanting) with minimum mulch disturbance. The mulch is used for moisture conservation and to protect the field surface from wind and water erosion. The herbicides and insecticides establish a seedbed free from competition by killing the cover crop to convert it into a mulch and by controlling weed growth and insect pests. The planter cuts through the mulch to open a furrow in the soil sufficient to deposit seed (or plants) and closes the furrow.

Special machine requirements must be met. No-tillage planters must be designed to be flexible enough to transverse moderate undulations without effecting the planting depth on any row and to have components which will track around contour curves. In areas where the benefits from the control of wind and water erosion control are the greatest, no-tillage planters and transplanters will need to operate through wide ranges of soil hardness and moisture conditions in the same field. Although no-tillage planting in mulches gives better yield responses in crusting, non-fracturing soils, the practice has already spread to other soil types. Basic requirements of a no-tillage planter opening unit are that it floats over subsurface obstructions and plants at the desired depth across a field moist enough for seed germination but dry enough for tractor mobility.

The instant novel soil furrow opener, which we term the "combination-opener," consists of a smooth rolling coulter operating deeper than the desired furrow depth and a pair of discs mounted at appropriate angles (5° at 45° from horizontal) so that they contact the rolling coulter at or slightly below the soil surface and so that they open a furrow the minimum desirable width for deposition of transplants or of seed.

Soil penetration with the combination opener is achieved by applying vertical force downward either by direct weighting with ballast or by weight transfer through a device such as springs from the weighted machine frame. The prototype transplanter uses direct ballast weights on the opener frame. Direct ballast applies best to one-row machines. The prototype planter is a demonstration of the use of weight-transfer springs. Weight-transfer methods allow flotation of each row unit of a multiple-row machine while maintaining adequate downward force and while furrow depth is maintained by devices such as depth bands (as used on the prototype planter) or by guage wheels. Vertical penetration force varies considerably with field conditions. We suggest using 600 pounds per row unit to facilitate operation in the hardest soil condition that we have encountered. The weight of riding operators on transplanters is considered as part of the 600 pounds but planting units will require the total in ballast including seed and fertilizer weight.

Furrow depth is controlled by using guage wheels on the supporting tool bar for the one-row prototype transplanter. This would possibly be adequate also for two-row machines. Seed planting depths may require closer control than transplanting depths and planters are normally used in four-row or larger combinations. For these reasons, each planter row unit must be individually suspended so that it can follow terrain undulations by using either depth bands (from conventional double-disc opener planters) on each disc or by using guage wheels mounted on one or both sides of each unit.

No-tillage transplanters using double-disc openers or combination-openers require a pair of narrow wings-mounted behind the discs and operating below the soil surface to hold the furrow open for transplant deposition.

Seed planters deposit seed between the discs of the combination-opener with the seed tube placed forward so that the discs do not move soil into the end of the tube and so that the seed falls where the furrow is opened the widest. A seed firming wheel is spring-loaded and mounted to track behind the seed tube and between the trailing portion of the two discs. Because of the narrowness of the furrow and because of its natural tendency to close after passage of the two discs, the seed firming wheel is also narrow. It consists of a disc ¼ to ¾ in. thick and 9 in. in diameter mounted similar to conventional 1-in. by 10-in. rubber seed firming wheels.

Furrow closure under no-tillage field conditions has been a constant problem with conventional no-tillage planters. The problem appears to be associated with generally uncontrolled tracking between cutting coulters, furrow openers and rear press wheels. The combination-opener design provides cutting and furrow opening functions without tracking problems and with a minimum of soil disturbance. The resulting furrow is a cleanly cut slit in the soil and surface trash. Closure of this furrow requires the application of pressure upon the upraised soil directly adjacent to the open slit. This must be performed on both sides of the furrow. We have found that a pair of narrow weighted press wheels with their axles set at 12° (transplanter) or 10° to 15° (planter) from horizontal, so that they are closest together at bottom-dead-center, conform to the natural shape of the furrow edge and effectively close the furrow as they closely trail the combination opener. This wheel system is used for our transplanter and planter prototypes. The edges of the wheels are ½ in. wide and a taper to 1½ in. wide. They also provide traction for driving the transplanting plant-chain and seed hopper mechanisms, respectively. The transplanter press wheels are 22 in. in diameter and weigh 100 lb. each. They effectively close furrows which are nominally 3.5 in. deep. The planter press wheels are 14 in. in diameter and weigh 70 lb. each. They effectively close furrows which are 1 in. to 2 in. deep, depending upon the crop. The press wheels on both machines are hinged to allow flotation over undulated terrain independent of vertical movement of the combination-opener frame. This hinging allows constant furrow-closing pressure independent of the penetration force required for the combination-opener.

Components in row units must track one another if their functions are to be properly executed. Tracking becomes especially critical when multiple row units are combined, when transplanting or planting is to be done on curved or contoured rows, and when operating on side slopes. The combination-opener and press wheels can be pivot-mounted so that they tract almost perfectly. The combination-opener frame is pivot-mounted from the tool bar on a vertical post similar to the mounting of a rolling coulter on a moldboard plow. This allows the combination opener to pivot in response to changes in direction of travel. The vertical post is positioned ahead of the rolling coulter and discs so that they tend to run on a straight line or smooth curve rather than leading off to one side or the other.

The rear press wheels must also track. This is extremely important in the case of the transplanter because non-tracking would damage the transplants in the row. A second pivot point with a vertical post is provided for the rear press wheels. In the case of the transplanter, it is mounted on a special frame attached to the tool bar to avoid blocking the open-center frame which is the path of the transplants. Extensions of the combination-opener frame guide the rear press wheel frame, at a point described by the intersection of tangents to their turning arcs so that near-perfect tracking is achieved. Other designs may give the same performance. In the case of the planter, the vertical pivot post is mounted on the rear of the combination-opener frame and guidance is not required. Both machines track at the selected minimum turning radius of 50 ft. and on side slopes.

OBJECTIVES

It is the principal object of this invention to provide a furrow opener and apparatus for no-tillage transplanters and planters.

It is another object of this invention to provide furrow opening with minimum soil disturbance and with minimum deposition of soil upon the original field surface.

A third object of this invention is to provide furrow opening ability in dry hard soils and through previous-crop residue.

A fourth object of this invention is to achieve machine flotation over undulated terrain.

A fifth object of this invention is to achieve machine component tracking on curved rows and across side slopes.

A sixth object of this invention is to provide adequate furrow closure around transplant seedlings and over deposited seed.

A seventh object of this invention is to achieve seed firming in the bottom of the furrow.

An eighth object of this invention is to provide a compact, easily usable, rugged, and practical machine.

Other objects and advantages of this invention will further become apparent hereinafter and in the drawings, in which.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Figure 1:
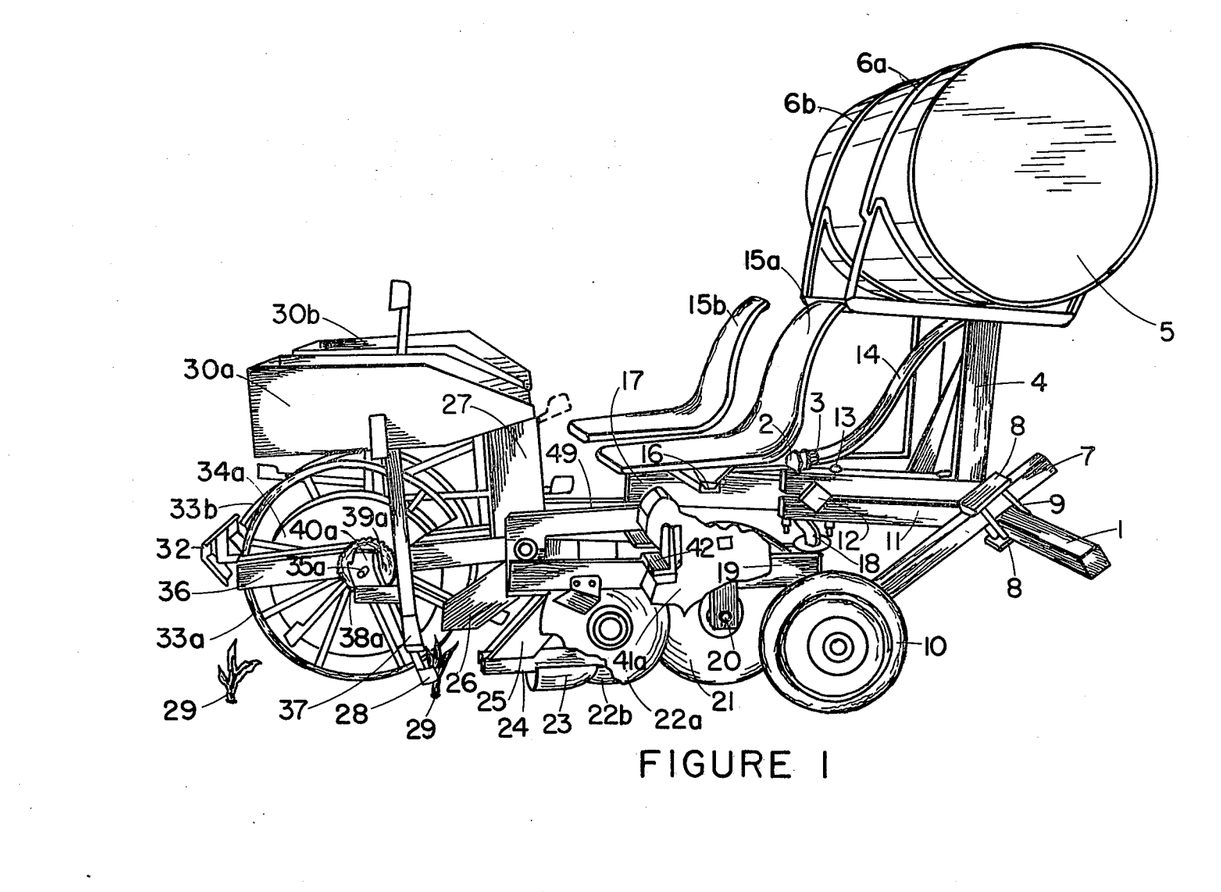
FIG. 1 is an isometric view of the transplanter version of the furrow opener.
Figure 2:
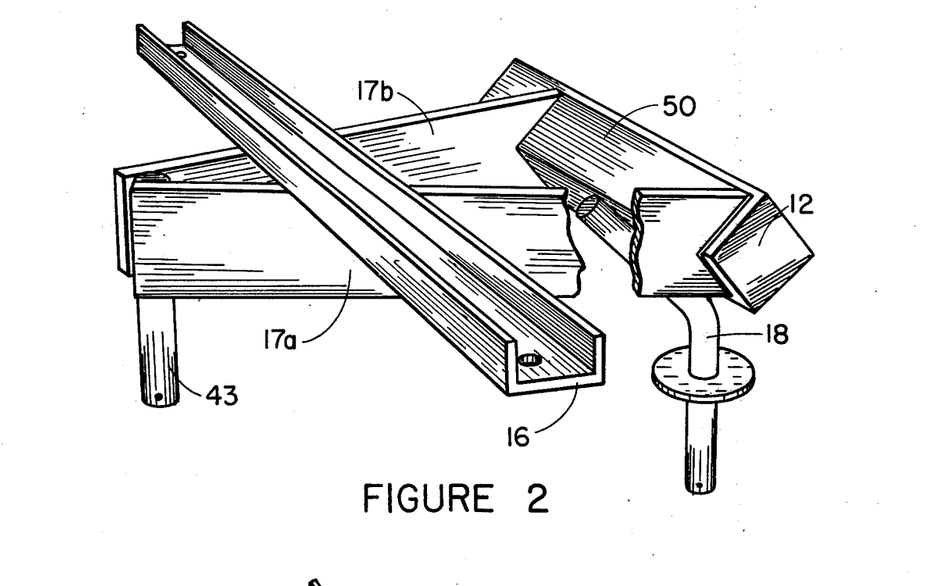
FIG. 2 is an isometric view of the upper frame assembly.
Figure 3:
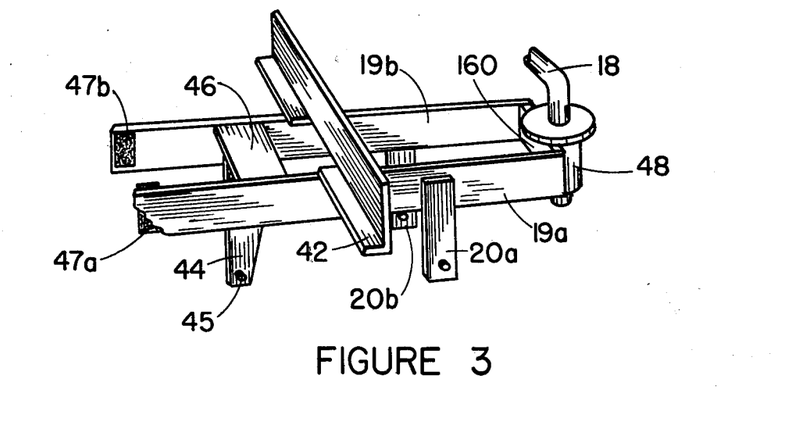
FIG. 3 is an isometric view of the front frame assembly.
Figure 5:
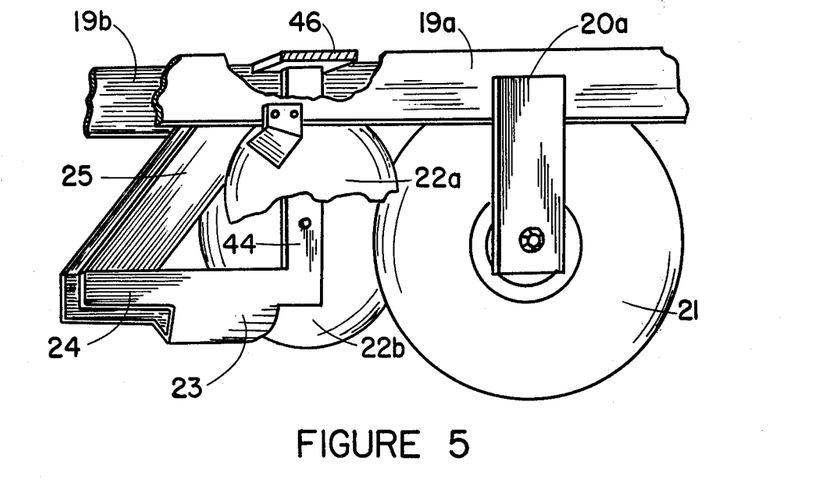
FIG. 5 is an isometric view of the opener assembly mounted on the front frame.
Figure 6:
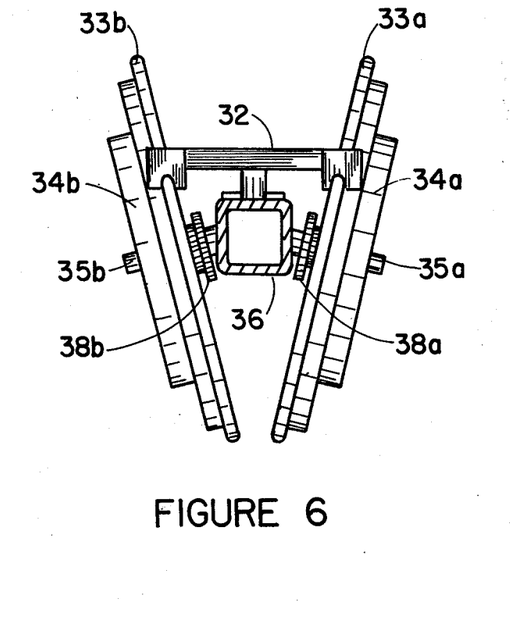
FIG. 6 is an isometric view of a rear view of the dual rear press wheel assembly.

Turning now to the specific embodiment of the invention illustrated in the drawings, where the transplanter version of the invention is shown in FIG. 1, through FIG. 6. Following FIG. 1, a typical tool bar 1 affixed with two depth-guage wheel 10 supported by adjustable struts 7 each secured by four bolts 9 through two plates 8 to tool bar 1, is attached to a farm-type tractor equipped with a powered lift. A tool-carrier trailer would perform the same function as the above tool bar and guage wheel assembly. A water tank 5 is mounted on tool bar 1 by strut assembly 4 and secured by rods 6a and 6b. Hose 14 leads from the barrel to a conventional water metering valve (not shown). Tool bar frame extensions 11 supporting a second tool bar 12 are secured with bolts 13. The one-row unit of a transplanting machine is attached by two conventional tool bar clamps 2 secured by bolts 3. As seen from FIG. 1, and 2, clamps 2 secure angle-iron 50, FIG. 2, to tool bar 12. Frame members 17a and 17b are angled from either end of 50 to meet against vertical rear pivot shaft 43 which is on the centerline of the machine. Seat support beam 16 is rigidly fastened to 17a and 17b for bolted attachment of worker seats 15a and 15b. The front frame pivot shaft 18 is rigidly fastened to 50. As seen in FIG. 3, the front frame is pivotally attached to shaft 18. Side rails 19a and 19b are rigidly fastened to pivot block 48 which is fastened to a front crossmember 160. Vertical struts 20a and 20b are rigidly mounted onto the side rails 19a and 19b respectively and provide mounts for a conventional smooth-type, approximately 17-inch diameter rolling coulter 21, FIG. 1, which is positioned vertically on the centerline of the machine. Crossmember 46 FIG. 3, provides a rigid support for vertical strut 44 with mounting pads 45 on each side, each for attachment of a conventional flat disc 22a and 22b, located on each side of strut 44, FIG. 1 and 3, as used on planter double disc furrow openers. The pads 45, FIG. 3, are angularly mounted so that each of the flat discs 22a and 22b are angled to enable their outer edges to be closed together where they are positioned on either side of the rolling coulter and below the soil surface level. This angle can be described as follows: Draw a circle and bisect it with horizontal and vertical lines through the center. In the lower right quadrant bisect the circumference of the circle with a radius of 45° below the horizontal. That point on the circumference will represent the closest point at which the discs must come together and will achieve the optimum result. The flat discs 22a and 22b so angularly mounted and operated below the surface of the soil, laterally move soil in both directions forming a furrow. As seen in FIG. 5, a V-shaped boot 23 adapted from a double-disc corn planter opener may be used to follow in the furrow. A pair of approximately parallel wing members 24, rigidly attached to the boot and extending backward along the furrow operate below the top of the soil surface and hold the forrow open for deposition of plants in the furrow. Plant guides 25 on either side of the centerline extend down to wings 24 to guide seedling plant roots into the furrow. This completes the description of the novel soil furrow opener which consists of rolling and cutting discs to first cut through debris and hard soil and then to open the furrow with minimum of soil movement and minimum of soil deposition upon the soil surface.

Ballast weight for soil penetration is provided by multiple cast iron weights 41a and 41b. 41a is shown on FIG. 1. 41b is not shown but would be opposite and parallel to 41a. 41a and 41b are secured on weight frame 42, FIG. 1 and 3, directly over the furrow opener.

The front frame assembly shown in FIG. 3, pivoting on 18 allows the furrow opener to freely track on a curved path when the towing tractor is being turned from a straight path. Bearing pads 47a and 47b FIG. 3, laterally bear on rear frame members 49a and 49b, FIG. 4, so as to turn the rear frame about pivot shaft 43 when the tractor is being turned. This action effectively steers the rear press wheels along the same curved path as taken by the furrow opener. This steerage is made possible by designing the frame members so that the bearing pads 47a and 47b, FIG. 3, are at the point of intersection of the centerline of the furrow opener and the centerline of the rear press wheel assembly when each of these are both following the same curved path. Alternate frame designs (not shown) can produce this same component-tracking function.

Figure 4:
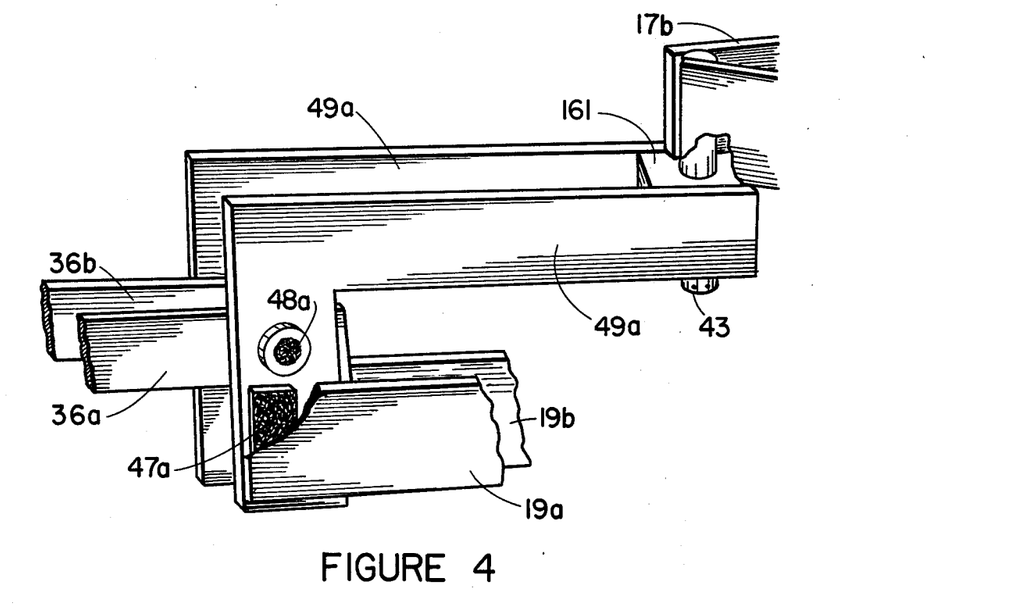
FIG. 4 is an isometric view of the method of attachment of the upper frame assembly to the middle frame assembly to the dual rear press wheel assembly.

The rear press wheel frame members 36a and 36b, FIG. 4, are pivotally attached by bolts 48a and 48b (not shown) since it is parallel to and opposite of side 48a. This allows vertical "flotation" of the rear press wheel without altering the working depth of the furrow opener. Dual rear press wheel assemblies are conventionally journaled onto angled axle shafts 35a and 35b, FIG. 6, so as to move loosened soil on both sides of the opened furrow back into the furrow around the deposited seedling plant 29, FIG. 1, so that the plant roots and lower stem are completely covered and firmed in the soil. The press wheel rims are necessarily narrow and may have ribs circumferentially attached such as 33a and 33b, FIG. 6, to concentrate the wheel pressure at the edge of the open furrow. Wheel angle is a conventional 12° to 15° from vertical for transplanting machines. Press wheel ballast weights 34a and 34b are rigidly secured to each wheel to supplement rear press wheel pressure. The amount of weight is determined by the condition of the terrain.

Chain sprockets 38a and 38b rigidly fastened to each rear press wheel drive the planting arms 28, FIG. 1, by means of chain 40a and 40b (not shown but opposite 40a) to sprockets 39a and 39b (not shown but opposite 39a). This is a conventional planting arm drive and arm system. Workers individually place transplants, carried in boxes 30a and 30b, into grippers on arms 28 as they travel past them. Shields 27 and 26 on both sides of the machine activate the arm grippers to hold and release the plants. Workers rest their feet on foot rest 37.

Rear press wheel scraper assembly 32, FIG. 6, is flexibly mounted onto the rear of frame 36. Scraper shape corresponds to press wheel rim shape to remove sticking soil.

Alternate types of plant gripping and deposition systems could be used behind the furrow opener without change of furrow opening and closing functions and if mounted compatible with frame geometry explained above, acceptable machine component tracking and flotation may be achieved.

Figure 7:
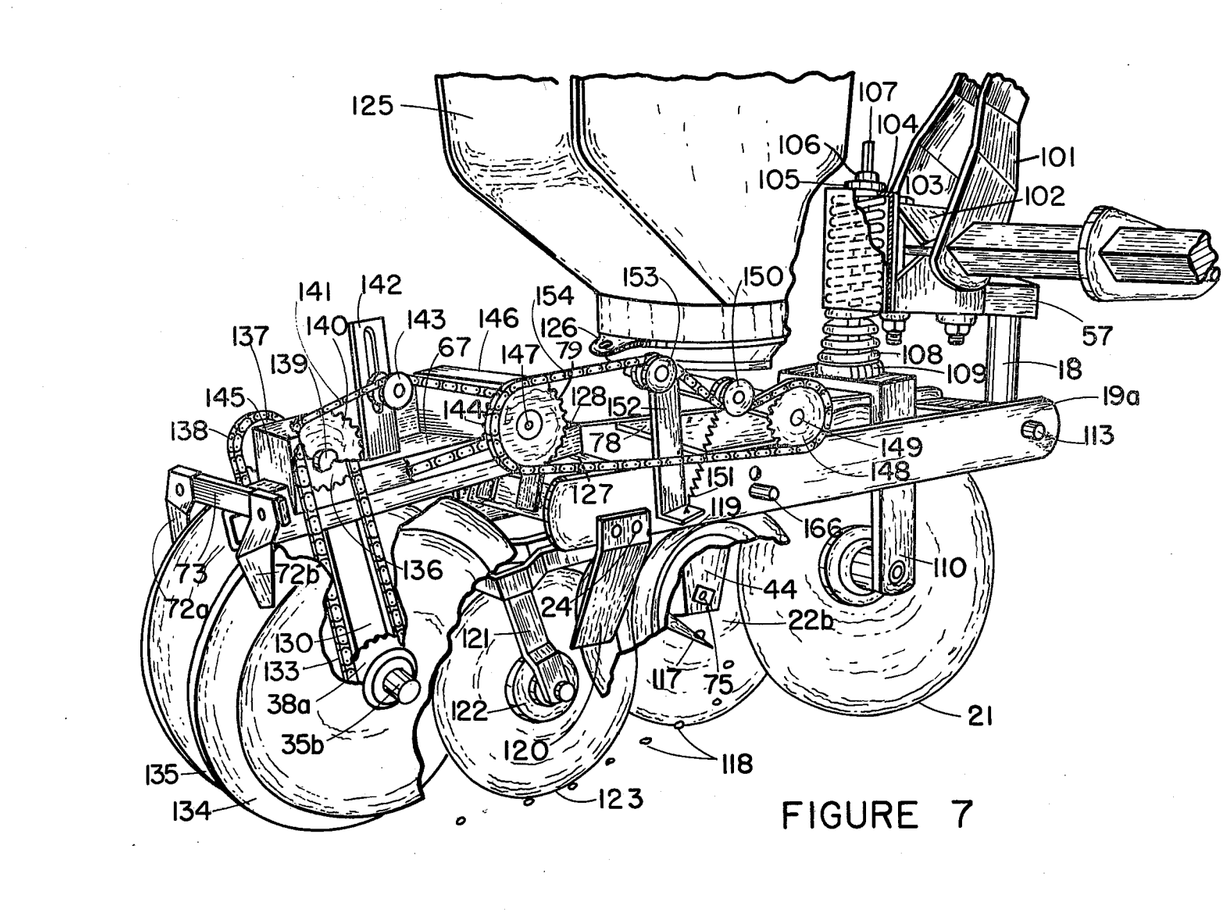
FIG. 7 is an isometric view of the seed planter embodiment of the opener.
Figure 8:
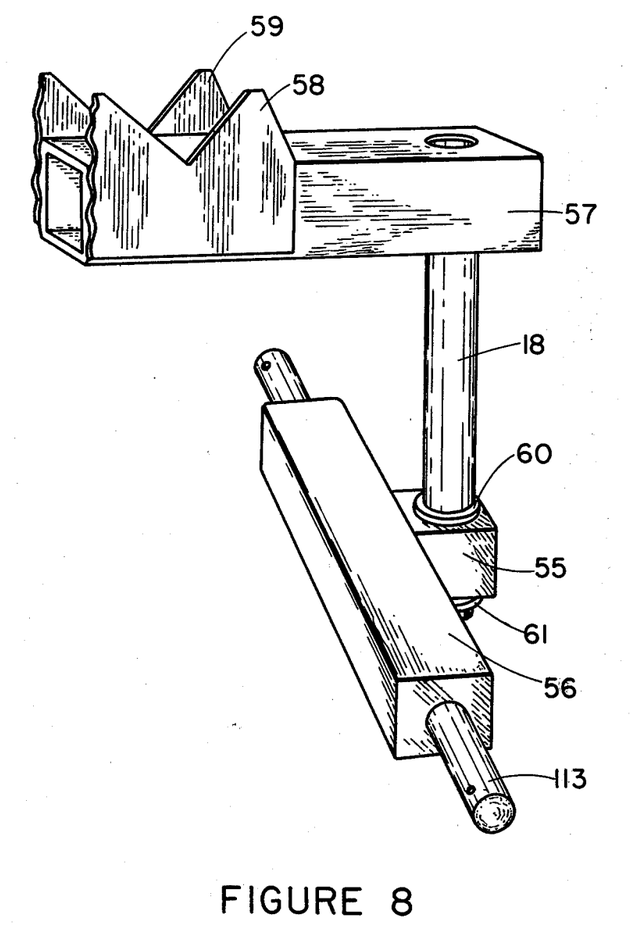
FIG. 8 is an isometric view of the front support.
Figure 12:
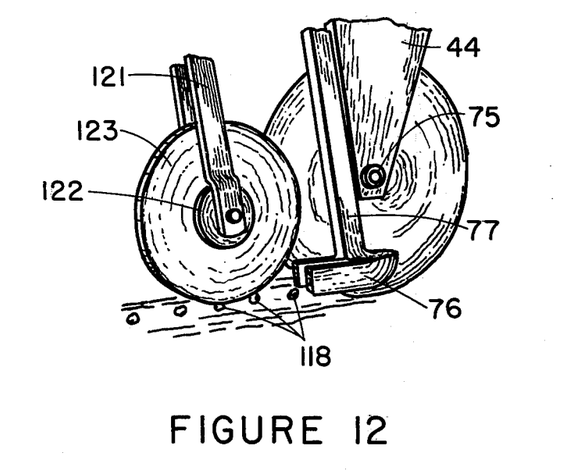
FIG. 12 is an isometric view of the optional furrow opener boot.

The seed-planter version of the invention is shown in FIG. 7, through FIG. 12. Following FIG. 7, a typical tool bar assembly 101 is affixed with gauge wheels or tool-carrier transport wheels (not shown) is attached to a farm-type tractor equipped with a power lift means. The entire planter assembly is illustrated as being of the unit-planter type for variable positioning along the tool bar or tool-carrier frame. Other fixed row spacing attachments may be used without deviating from the function of the invention. The front support, FIG. 8, is comprised of a tubular bar 57, fitted with two vertical plates 58 and 59 to fit a standard tool bar. This front support is secured to tool bar 101, by a conventional clamp 102, and two long bolts 103. As seen in FIG. 7, bar 57, supports compression cylinder 104 which contains compression spring 108, which transfers weight from the tool bar frame and keeps the mechanism vertically flexible over rough terrain, guided by rod 107, with a rod-stop 106, and washer 105, limiting the travel of the compression spring 108, and providing a lifting means for the whole unit planter. Rod 107, is pivotally attached to arch 110, which comprises 20a and 20b, for effecting the machine lifting force. Ring 109, on arch 110, positions the base of spring 108.

Bar 57 also supports the front vertical pivot shaft 18 which allows angular motion of the entire unit planter and in particular of the furrow opener to follow a curved path when the towing tractor is also turning on a curved path. Pivot assembly, FIG. 8, consists of a vertical pivot journal block 55 restrained from vertical movement by affixed washer 60 and pin 61. Block 55 is rigidly affixed to horizontal journal block 56 with shaft 113 rotationally free within block 56. Planter "flotation" is effected by rotation of shaft 113.

The front frame member assembly consists of side members 19a and 19b, FIGS. 7 and 9, rigidly affixed to support arch 110 and other crossmembers functionally described later. Arch 110, provides mounts for a conventional smooth-type, approximately 17-in. dia. rolling coulter 21, FIG. 7, positioned vertically on the centerline of the machine first. Crossmember 78 provides a rigid support for conventional seed metering mechanism base 126, affixed with seed hopper 125. The type of metering mechanism is not pertinent to the invention and a seed tube communicating with a remote seed reservoir and/or metering mechanism would be functionally compatible first. Crossmember 78 also provides a rigid support for vertical strut 44 with mounting pads 75 on each side, each for attachment of a conventional flat disc 22a, and 22b on each side of strut 44 as used on planter double disc furrow openers. Disc mounting and function is identical to those of the transplanter version, FIG. 5.

Figure 11:
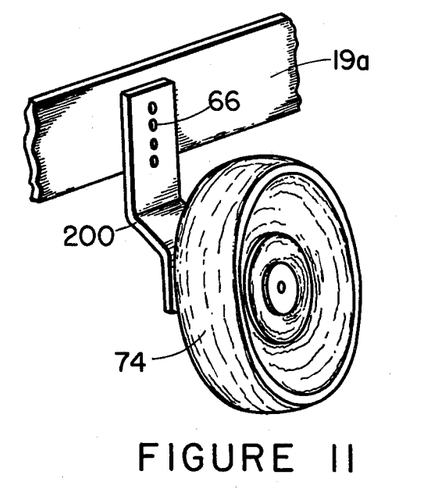
FIG. 11 is an isometric view showing how the depth gage wheel is fastened to the front frame.

The furrow opening discs are fitted with adjustable soil scrappers 120 and conventional depthcontrolling rings 119, available in various diameters for various planting depths. An alternate depth control means, FIG. 11, is accomplished by adjustably affixing a depth gauge wheel assembly 74 on a strut 200 on each side of the planter by affixing strut 200 with pin 66 onto frame members 19a and 19b. Only one of the two depth control means would be used at any one time. Seed 118, FIGS. 7 and 12 from a metering mechanism 126 or other means drops down seedtube 77 and is directed into the open furrow either by angled deflector 117 or seed boot 76, FIG. 12. Other seed tube designs which do not limit the furrow opener function may be used without reducing the value of the invention.

Seed firming wheel 123, mounted on bearing hub 122, and supported by pivoting bracket 121, in a conventional manner, presses seed 118 into contact with soil in the bottom of the open furrow. Wheel 123, may be a disc fabricated from metal or a flexible material such as semi-rigid plastic or natural or synthetic rubber. Wheel 123 is ¼ inch to ¾ inches in thickness with adequate performance having been demonstrated with a ½-inch thickness disc 9 to 10 inches in diameter. Wheel 123 may be spring-load (not shown) in a conventional manner for exerting more force upon the seed.

Figure 9:
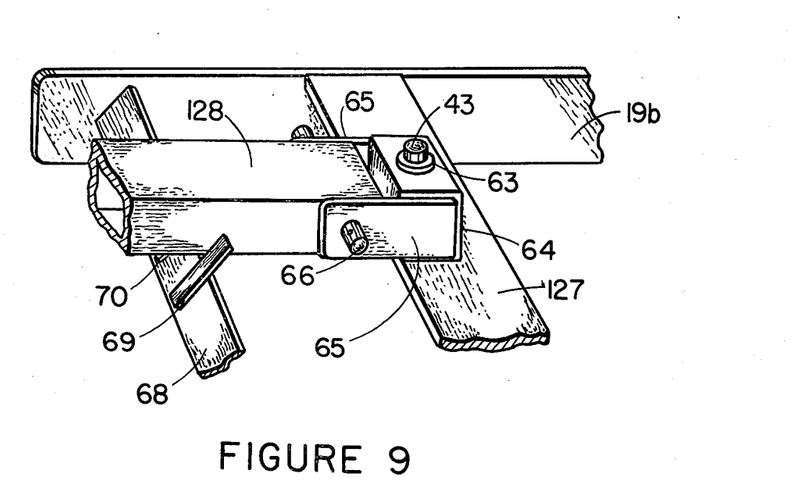
FIG. 9 is an isometric view of the pivoting attachment of the rear frame to the front frame.
Figure 10:
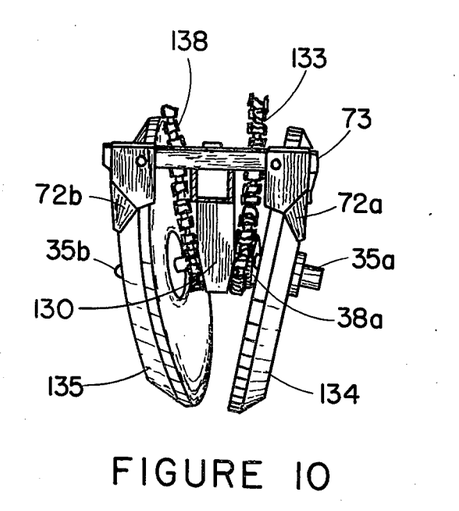
FIG. 10 is an isometric view of a rear view of the dual rear press wheel assembly.

As illustrated in FIG. 9, the rear frame 128, is laterally pivoted by means of vertical pivot shaft 43 rigidly affixed to second crossmember 127 on the machine centerline, at the point of intersection of the centerline of the furrow opener, assembly and the centerline of the rear press wheels, so that the rear press wheels will travel on the very same curved path as followed by the furrow opener when the towing tractor is turning. Vertical movement on shaft 43 is restrained by washer and pin assembly 63. Journal block 64 on shaft 43 has two projections 65 each with a hole for horizontal pivot pin 66 which passes through projections 65 and frame tube 128. Pin 66 allows vertical flotation of the rear press wheels without altering the function of the furrow opener. Third Crossmember 68 with stops 69 and 70 provides lifting means for the rear press wheel assembly and lateral pivoting limitation to avoid drive chain disengagement during transport. Rear press wheel assembly as shown in FIG. 7 and 10, consists of tubular frame 128 with a rigidly attached perpendicular strut 130 with wheel axle shaft 35a and 35b rigidly attached at an angle typically 10° to 15° from vertical. Press wheels 134 and 135 are solid metal to provide ballast weight to act on the edges of the open furrow to close it over the deposited seed 118. The press wheels have narrow ½-inch wide rims to concentrate the force upon the edge of the open furrow. Design and function of the rear press wheels on the transplanter and planter versions of the invention are of identical intent. Drive chain sprockets 38a and 38b (not shown) are rigidly attached to the side of each press wheel to provide driving power through chain 133 and 138 to sprockets 136 and 137 on either end of shaft 139 journaled in bearing block 145. Changeable sprocket 140 drives chain 141 to sprocket 144 on shaft 147 journaled in bearing block 146. Changeable sprocket 79 also on shaft 147 drives chain 154 over spring loaded 151, tightener 152, with tightener spools 153 and 150, to changeable sprocket 148 on shaft 149 communicating with metering mechanism 126. The drive assembly may also provide a power drive to an auxillary insecticide metering mechanism from shaft auxillary drive not shown).

Journal blocks 145 and 146 and chain tightener 142, with tightener spool 143, are rigidly mounted on slidable plate 67 bolted onto frame 128 so as to effect tension adjustment in chains 133 and 138. Wheel scraper blades 72a and 72b, FIG. 10, shaped to conform to press wheel shapes and bolted onto bracket 73 which is bolted onto frame 128.

Drive may be provided by a common jackshaft across a tool-carrier frame and eliminate the need for providing drive means from the rear press wheels without changing the intent or functional value of the invention. Other means of providing force on side members 19a and 19b to obtain adequate soil penetration with the furrow opener may be ballast weights as illustrated on the transplanter version, FIG. 1, of left spring (s), or hydraulic pressure applicator. or other means if the frame is free to laterally pivot about 18 to follow a curved path when the towing tractor is turning. As illustrated in FIG. 7, the tool bar 101 or substitute toolcarrier provides ballast weight transferred through spring 108 to the furrow opener. Additional ballast weight may be added to the tool bar for additional weight transfer.

Having thus described our invention we claim:

1. A unit planter for the opening of furrows under no-tillage conditions and for planting of seeds comprising in combination:

a. a tool bar set at an angle and affixed to two depth gauge wheels by means of adjustable strut members;

b. a front support comprising: a tubular bar positioned horizontally with two parallel vertical plates affixed to opposing sides of the tubular bar which fit to said tool bar, and a pivot assembly, said front support secured to said tool bar by means of a clamp and two long bolts, said tubular bar also supporting a compression cylinder;

c. said compression cylinder comprising: a compression spring which transfers weight and is used to maintain flexibility over rough terrain, a rod positioned inside the center of said compression spring to guide said spring, a rod stop to limit the travel of said compression spring, said rod being pivotally affixed to an arch which is shaped like a runing fork in the vertical position with the open end down, said arch providing lifting force and a ring located between the base of said spring and said arch to properly position said spring onto said arch;

d. said tubular bar being affixed to a pivot shaft which allows for angular motion of the entire unit-planter and communicates with a front frame member assembly which is rigidly affixed to the arch which also provides mounts for a rolling coulter which is positioned vertically on the centerline of the unit-planter;

e. a seed metering mechanism affixed to a seed hopper and mounted on a first cross member which is affixed to the front frame member assembly, said seed metering mechanism also being affixed to a tube which communicates with a remote seed reservoir;

f. a vertical strut affixed to the first crossmember and extending downward with mounting pads affixed to each side of the vertical strut for mounting an opening assembly;

g. said opening assembly, to effect disc location on each side of the coulter and communicating with a front frame assembly, said seed metering mechanism metering seed through said seed-tube which directs said seed into the furrow which has been opened by said furrow opener;

h. a seed firming wheel mounted on a bearing hub and supported by a pivoting bracket for pressing said seed into contact with soil in the bottom of the furrow which has been opened;

i. a rear frame laterally pivoting by means of a vertical pivot shaft, said shaft being rigidly affixed to a second crossmember on the centerline of the machine, at the point of intersection of the centerline of the furrow opener assembly and the centerline of a set of rear press wheels of a rear press wheel assembly so that the rear press wheels will travel on the very same curved path as followed by the furrow opener when being towed by a towing means, vertical movement on said vertical pivot shaft being restrained by a washer and pin assembly, a journal block circumambient to said vertical pivot shaft and having communicating with a tube frame, said tube frame being affixed to a third crossmember which provides a lifting means for said rear press wheel assembly and means to limit lateral pivoting limitation to avoid drive chain disengagement during transport, said third crossmember affixed with two stops which communicate with said rear press wheel assembly which communicates with said journaled bearing block which is affixed to a changeable sprocket which communicates with a drive chain which communicates with a sprocket affixed to a shaft journaled in said block, said shaft also having a second changeable sprocket which drives a chain over tightener comprising two tightener spools and said chain communicating with said sprocket on said shaft which communicates with said seed mechanism.

2. The apparatus as defined in claim 1 wherein the pivot assembly comprises in combination:
 a. a vertical pivot journal block restrained from vertical movement by an affixed
 b. washer and
 c. pin, said vertical journal block affixed to
 d. a horizontal journal block with a
 e. horizontal shaft located within the horizontal journal block and maintained rotationally free thus resulting in unit-planter "floatation" by rotation of said shaft.

3. The apparatus as defined in claim 1 wherein the front frame member assembly comprises in combination:
 a. two parallel horizontal rigid frame members,
 b. said a crossmember affixed between said parallel horizontal rigid frame members and
 c. vertical strut affixed to the center of and extending downward from the parallel horizontal rigid frame members,
 d. said mounting pads affixed to each side of said vertical strut
 e. said mounting pads affixed to the inside of the two parallel horizontal rigid frame members,
 f. a crossmember affixed across the top of the said parallel horizontal rigid frame members said crossmember adapted to retain changeable weights,
 g. a vertical pivot installed in a journal block which is affixed to a crossmember which is affixed between the front of the parallel horizontal rigid frame member.

4. The apparatus as defined in claim 1 wherein the rolling coulter is a 17-inch diameter conventional smooth type.

5. The apparatus as defined in claim 1 wherein the metering mechanism is a standard conventional metering device for metering seed.

6. The apparatus as defined in claim 1 wherein the opening assembly comprises in combination: discs on each side of the rolling coulter said discs angularly mounted to the vertical and affixed to a vertical strut member, so as to be on opposite sides of the rolling coulter.

7. The apparatus of claim 6 wherein the furrow opening discs are fitted with adjustable soil scrapers.

8. The apparatus of claim 6 when the furrow opening discs are fitted with conventional depth-controlling rings to allow for various planting depths.

9. The apparatus of claim 1 wherein the depth control means comprises an adjustable depth gauge wheel assembly installed on each side of the planter by means of affixing said gauge wheel assembly to a front frame by means of an adjustable strut member.

10. The apparatus as defined in claim 1 wherein the seed firming wheel is a disc fabricated from rigid material.

11. The apparatus as defined in claim 1 wherein the seed firming disc is $\frac{1}{4}$ to $\frac{3}{4}$ inches thick and 9 to 10 inches in diameter.

12. The apparatus as defined in claim 1 wherein the seed firming disc is spring-loaded for exerting additional force on the seed.

13. The apparatus as defined in claim 1 wherein the means by which the journal block communicates with the frame tube comprises:
 two parallel projections affixed rigidly to opposing sides of the journal block, extending to the opposing sides of the tube frame and hinged to the tube frame by means of
 horizontal pivot rod which passes through the rube frame and the projections by means of
 a matching hole through the tube frame and the projections.

14. The apparatus defined in claim 1 wherein the rear press wheel assembly comprises:
 a. rear press wheel frame members pivotly attached by
 bolts to allow for flotation without altering the working depth of the furrow opener and said press wheel frame members being
 b. journaled onto two axle shafts said axle shafts set at an angle from the vertical to provide movement to loosened soil on both sides of the opened furrow, said axle shafts being affixed to
 c. solid press wheel rims which are angled to the vertical and affixed to
 d. ballast weights to act on the edges of the open furrow to close it over the deposited seed, said press wheel rims being narrowed to $\frac{1}{2}$ inch wide at the outer circumference to concentrate the force upon the edge of the open furrow, and
 e. drive chain sprockets rigidly attached to the side of each press wheel to provide driving power through
 f. a chain.

15. The apparatus of claim 14 wherein the axle shafts are angled at 10° to 15° from vertical.

16. The apparatus of claim 14 wherein there is a scraper assembly flexibly mounted onto the rear frame and the scraper shape corresponds to the press wheel rim.

17. The apparatus as defined in claim 1 wherein the drive assembly also provides a power drive to an auxillary insecticide metering mechanism as well as a seed metering mechanism.

18. The apparatus of claim 1 wherein the journal blocks and chain tightener with tightener spools are rigidly mounted on a slidable plate which is bolted onto a frame so as to effect tension adjustments in the drive chains.

19. The apparatus as defined in claim 1 wherein the drive is provided by means of a common jackshaft across a toolcarrier frame.

20. The apparatus as defined in claim 1 wherein the seed firming wheel is a disc fabricated from a flexible material.

* * * * *